US010807059B2

(12) United States Patent
Xu et al.

(10) Patent No.: US 10,807,059 B2
(45) Date of Patent: Oct. 20, 2020

(54) METHOD FOR MAKING AEROGEL

(71) Applicant: City University of Hong Kong, Kowloon (HK)

(72) Inventors: Yan Xu, New Territories (HK); Walid Daoud, New Territories (HK); Michael K. H. Leung, Mid-Levels (HK)

(73) Assignee: City University of Hong Kong, Kowloon (HK)

( * ) Notice: Subject to any disclaimer, the term of this patent is extended or adjusted under 35 U.S.C. 154(b) by 241 days.

(21) Appl. No.: 16/007,003

(22) Filed: Jun. 13, 2018

(65) Prior Publication Data
US 2019/0381470 A1    Dec. 19, 2019

(51) Int. Cl.
*B01J 13/00*      (2006.01)
*C08J 9/28*       (2006.01)

(52) U.S. Cl.
CPC ............ *B01J 13/0091* (2013.01); *C08J 9/28* (2013.01); *C08J 2201/0484* (2013.01); *C08J 2205/026* (2013.01); *C08J 2205/042* (2013.01); *C08J 2327/16* (2013.01); *C08J 2365/00* (2013.01); *C08J 2367/04* (2013.01)

(58) Field of Classification Search
CPC .. B01J 13/0091; C08J 9/28; C08J 2201/0484; C08J 2205/026; C08J 2205/042
See application file for complete search history.

(56) References Cited

FOREIGN PATENT DOCUMENTS

CN          102941042 A    *   2/2013

OTHER PUBLICATIONS

Gordan et al., "Soft PEDOT:PSS aerogel architectures for thermoelectric applications," Journal of Applied Polymer Science, Jun. 16, 2016, Wiley Periodicals, 44070, pp. 1-9. (Year: 2016).*
Zhang et al., "Ultralight conducting polymer/carbon nanotube composite aerogels," Carbon, 49, (2011) 1884-1893. (Year: 2011).*

* cited by examiner

*Primary Examiner* — Kara B Boyle
(74) *Attorney, Agent, or Firm* — Renner Kenner Greive Bobak Taylor & Weber

(57) ABSTRACT

A method for making an aerogel includes the steps of a) soaking a wet gel having a liquid phase in at least one solvent to substantially replace the liquid phase in the wet gel with the solvent to form a soaked gel; b) freezing the soaked gel to form a frozen gel; and c) drying the frozen gel in a vacuum chamber to form an aerogel.

14 Claims, 5 Drawing Sheets

METHOD FOR MAKING AEROGEL

FIELD OF INVENTION

The invention relates to a method for making aerogel.

BACKGROUND

Aerogels have ultra-low density, good thermal insulating properties, and form strong structures due to their nano-scaled porous framework. The continuous framework structure of aerogel is promising as it allows the conductive material to maintain electrical conductivity.

The way to make an aerogel is to remove the solvent in a wet gel and retain the gel framework without destroying the same. A polymer hydrogel is a highly absorbent network of polymer chains that are hydrophilic, sometimes found as a colloidal gel in which water is the dispersion medium. An example of a polymer hydrogel is poly(3,4-ethylenedioxythiophene) polystyrene sulfonate (PEDOT:PSS). The most common method for all kinds of aerogel synthesis is supercritical $CO_2$ ($SC-CO_2$) drying, but this method is very expensive and the sample size is limited by the high pressure vessel. Another common method to make aerogel is freeze drying of a hydrogel, but cracking is a problem as water expands during freezing. Ambient dry is another method, which enhance the framework structure to bear the surface tension during solvent evaporate. This method makes the material mix with enhancer and only works for very limited materials.

An aim of the invention therefore is to provide a method for making aerogel which overcomes the above issues.

SUMMARY OF INVENTION

In a first aspect of the present invention, there is provided a method for making an aerogel comprising the steps of:
a) soaking a wet gel having a liquid phase in at least one solvent to substantially replace the liquid phase in the wet gel with said solvent to form a soaked gel;
b) freezing the soaked gel to form a frozen gel; and
c) drying the frozen gel in a vacuum chamber to form an aerogel.

In one embodiment, the aerogel comprises poly(3,4-ethylenedioxythiophene) polystyrene sulfonate. Preferably, the wet gel is prepared by mixing sodium polystyrene sulfonate and 3,4-ethylenedioxythiophene monomer at a molar ratio of from about 1:1 to about 2:1.

In one embodiment, in the step a), the wet gel is pretreated by soaking in an acid and then water sequentially for more than 1 day, before soaking in the solvent.

Preferably, the acid is hydrochloride acid, the water is deionized water and the solvent is acetic acid. In particular, the wet gel is further soaked in anhydrous alcohol for at least 1 time before soaking in acetic acid.

In one embodiment, the aerogel comprises polyvinylidene fluoride and has a water contact angle of more than 150°.

In another embodiment, the aerogel gel comprises poly-L-lactide acid and can withstand a force of at least 1000N before cracking.

Preferably, the solvent is acetic acid. In particular, the wet gel is soaked in increasing concentrations of acetic acid. For instance, the wet gel is soaked in 2.5% (v/v) acetic acid, and subsequent concentrations of acetic acid increasing by 2.5% (v/v) stepwise up to 100% (v/v). In another embodiment, the wet gel is soaked in anhydrous alcohol before soaking in the solvent which is in particular anhydrous acetic acid.

In a further embodiment, the solvent is anhydrous and/or any or any combination of formic acid, tert-butanol, dioxane, benzene, and/or the like.

In an embodiment, in the step b), the soaked gel is frozen by using liquid nitrogen or is frozen in a freezer.

Preferably, in the step c), the vacuum chamber has a pressure of <3 Pa and the frozen gel is dried in the vacuum chamber for at least 20 hours.

In a particular embodiment, the solvent has at least one of the features selected from having a saturated vapour pressure of more than 1000 Pa at its freezing point; or is miscible or partially miscible with the liquid phase of the wet gel.

In a second aspect of the present invention, there is provided an aerogel prepared according to the method above.

In an embodiment, the aerogel comprises poly(3,4-ethylenedioxythiophene) polystyrene sulfonate and has an average pore diameter of less than 15 nm. Preferably, the aerogel has an electrical conductivity of at least 0.5 S/cm.

In another embodiment, the aerogel comprises polyvinylidene fluoride and has a water contact angle of more than 150°.

In a further embodiment, the aerogel comprises poly-L-lactide acid and can withstand a force of at least 1000N before cracking.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 3a is an image of sample AAS9 taken with a magnification of 10.00 Kx. FIG. 3b is an image of sample AAS9 taken with a magnification of 20.00 Kx. FIG. 3c is an image of sample AAS10 taken with a magnification of 10.00 Kx. FIG. 3d is an image of sample AAS10 taken with a magnification of 20.00 Kx. FIG. 3e is an image of sample DMSOAAS3 taken with a magnification of 10.00 Kx. FIG. 3f is an image of sample DMSOAAS3 taken with a magnification of 20.00 Kx. FIG. 3g is an image of sample hydrogel taken with a magnification of 6.00 Kx. FIG. 3h is an image of sample hydrogel taken with a magnification of 20.00 Kx.

DETAILED DESCRIPTION

Figure 1:
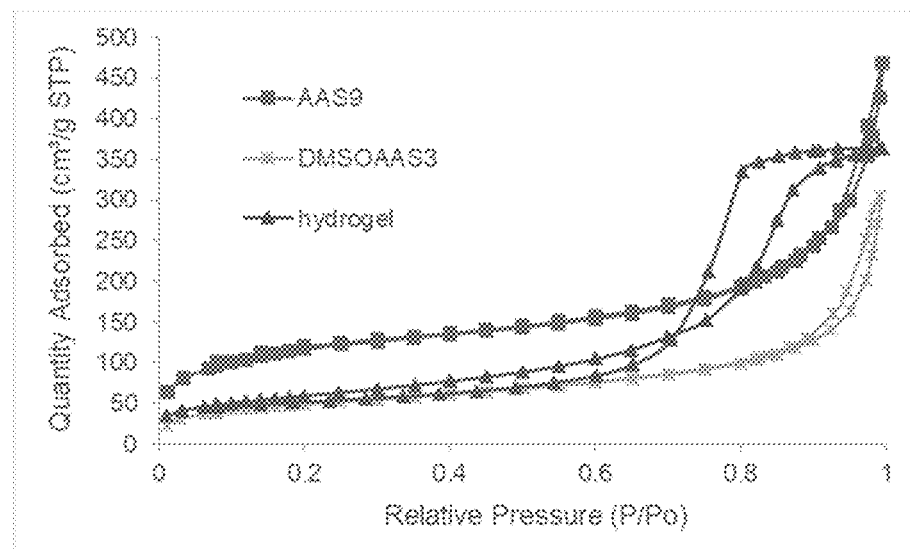
FIG. 1 is a chart illustrating typical nitrogen adsorption and desorption isotherms

In the first aspect of the invention, there is provided a method for making an aerogel comprising the steps of:
a) soaking a wet gel having a liquid phase in at least one solvent to substantially replace the liquid phase in the wet gel with said solvent to form a soaked gel;
b) freezing the soaked gel to form a frozen gel; and
c) drying the frozen gel in a vacuum chamber to form an aerogel.

The term "aerogel" as used herein refers to a solid material prepared from a gel in particular a wet gel in which the liquid phase therein is removed. In general, an aerogel comprises a porous body having a plurality of spaces filled with air. The aerogel may be an organic or inorganic aerogel selected from the group consisting of a silica aerogel, a carbon-based aerogel such as a graphene aerogel, a metal oxide aerogel, and the like.

As used herein, the term "wet gel" refers to a gel like or jelly-like material which has a cross-linked network holding a liquid therein. The cross-linked network is generally a solid framework structure. The wet gel comprises at least 70%, at least 75%, at least 80%, at least 85%, at least 90%, at least 95%, or about 99.5 of a liquid phase by weight based on the total weight of the wet gel. In an embodiment, the wet gel comprises at least 80% of a liquid phase by weight of the total weight of the wet gel.

Generally, the liquid phase is a dispersion medium used when preparing the wet gel. The liquid phase may be water, alcohol, acid, base or the like. The term "hydrogel" is used when the liquid phase is water. Water may be selected from the group consisting of deionized water, distilled water, and pure water. A wet gel comprising an alcohol as a liquid phase is considered as an "alcohol gel". The alcohol is preferably a C1-C4 alcohol which may be selected from methanol, ethanol, n-propanol, iso-propanol, n-butanol, sec-butanol, iso-butanol or tert-butanol. The term "acid gel" is used when the wet gel comprises an acid as a liquid phase. The acid may be organic acid or inorganic acid. Preferably, the acid is a carboxylic acid. In an embodiment, the acid is acetic acid or formic acid. The term "base gel" is used when the wet gel comprises a base as a liquid phase. The base may be an organic or inorganic base such as sodium hydroxide, calcium hydroxide, potassium hydroxide, sodium carbonate, ammonia or the like.

In some embodiments, the cross-linked network may also hold a substance such as a drug molecule, an excipient, or the like.

The term "solvent" as used herein refers to a liquid which is miscible or partially miscible with the liquid phase of the wet gel and/or is capable of dissolving any unwanted impurities produced when preparing the wet gel in particular unreacted components. Miscibility of the solvent refers to the ability of the solvent to mix with another liquid to form a homogenous solution, which may be determined by visual inspection. If two liquids are miscible, the mixture of them should be clear. If the two liquids are immiscible, they will separate into two layers or phases after mixing. If the two liquids are partially miscible with each other, i.e. to the extent between miscible and immiscible, it means that some portion of them will form a homogenous solution while the rest will be separated into two layers or phases. In an embodiment, the solvent is miscible with the liquid phase of the wet gel. In an embodiment, the solvent is an acid preferably a carboxylic acid. In another embodiment, the solvent is an organic solvent. The organic solvent may be dimethyl sulfoxide (DMSO), ethylene glycol or the like. In an alternative embodiment the solvent is any or any combination of formic acid, tert-butanol, dioxane, benzene, and/or the like.

In one embodiment the wet gel is soaked multiple times in the solvent which has a concentration of about 100% (v/v) or one or more further 100% (v/v) solvents. Preferably, the solvent is anhydrous acetic acid.

In another embodiment where the wet gel comprises PEDOT:PSS, the wet gel is soaked in 2.5% (v/v) acetic acid, and subsequent concentrations of acetic acid increasing by 2.5% (v/v) stepwise up to 100% (v/v).

In an embodiment, two solvents are applied in the step of soaking the wet gel. In a particular embodiment, the first solvent may be an organic solvent and a second solvent may be a carboxylic acid. For example, the wet gel is soaked with dimethyl sulfoxide or ethylene glycol and then acetic acid or formic acid.

In another embodiment, the solvent is acetic acid or formic acid, preferably acetic acid. In particular embodiment, the wet gel may be pre-treated with an acid, an alcohol and/or water before soaking in the solvent. For example, the wet gel may be pretreated by soaking in an acid preferably hydrochloride acid, and then water sequentially for more than 1 day, preferably for about 4-8 days, before soaking in the solvent. Furthermore, the wet gel may be further soaked in anhydrous alcohol for at least 1 time before soaking in the solvent, wherein the anhydrous alcohol is preferably anhydrous ethanol and the solvent is preferably anhydrous acetic acid. This approach can reduce or prevent the shrinkage effect caused by the replacement of the liquid phase in the original wet gel.

In one embodiment, the solvent has a saturated vapour pressure of more than 1000 Pa at it freezing point. "Saturated vapour pressure" refers to the pressure of a closed system where the amount of molecules of a solution escaping from the solution, i.e. evaporating, equals to the amount of molecules returning to the solution, i.e. condensing.

By using solvent replacement freeze drying (SRFD) method according to the invention, PEDOT:PSS aerogel is formed which has better performance than that obtained through the $SC-CO_2$ drying method The term "vacuum chamber" refers to a closed system where vacuum conditions are applied. Preferably, in the step c), the vacuum chamber has a pressure of <3 Pa and the frozen gel is dried in the vacuum chamber for at least 20 hours.

In an embodiment, the wet gel is a hydrogel and the liquid phase is water. When the wet gel is a hydrogel, the water inside the wet gel is replaced by the solvent. Advantageously, replacing the water inside the hydrogel with other solvents and then freeze drying the same as described above solves the aforementioned problems. The solvent to be selected preferably have the following properties. First, the solvent should cause no or minimal damage to the framework of the gel. In an embodiment, the solvent has no or almost no chemical reaction with the cross-linked network of the gel. In another embodiment, the solvent reacts with the cross-linked network to further enhance the electrical conductivity of the gel and the reaction does not result in deformation such as breakage, shrinkage and expansion, or loss of function of the gel. Second, the solvent left in the gel after the replacing process should have a saturated vapor pressure which measured at its freezing point higher than the pressure applied in the drying step (otherwise, the frozen gel can never be dried). The bigger the difference between the saturated vapor pressure of the solvent at its freezing point and the pressure applied in the drying step, the faster the sublimation rate of the solvent from solid to gas. Thirdly, the solvents should be miscible or at least partially miscible with the liquid phase in the gel.

In one embodiment the aerogel comprises poly(3,4-ethylenedioxythiophene) polystyrene sulfonate (PEDOT:PSS). Acetic acid and DMSO may be used to wash out some PSS to increase the electrical conductivity.

In one embodiment a PEDOT:PSS wet gel is prepared by mixing sodium polystyrene sulfonate (NaPSS) and 3,4-ethylenedioxythiophene (EDOT) monomer at a molar ratio of from about 1:1 to about 2:1, in particular about 1:1, then optionally adding an oxidant. Typically the oxidant is iron (III) nitrate nonahydrate ($Fe(NO_3)_3 \cdot 9H_2O$).

In one embodiment the newly formed PEDOT:PSS wet gel was soaked in acid and then water sequentially for more than 1 day or about 4 to 8 days, preferably after the addition of the oxidant and before soaking in the solvent. This washes out low molecular weight elements and the resultant wet gel is then applied to prepare the aerogel. Typically the acid is hydrochloric acid preferably with a concentration of 0.1M.

In an alternative embodiment the aerogel comprises polyvinylidene fluoride (PVDF) and has a water contact angle of about or more than 150°, about or more than 160°, or about or more than 170°. A PVDF wet gel is prepared by dissolving PVDF powder in dimethylacetamide (DMAC), heating to around 80° C., slowly adding ethanol, then cooling at −80° C. for gelling.

In a further alternative embodiment the aerogel comprises poly-L-lactide acid (PLLA) and preferably can withstand a force of at least 1000N before cracking. A PLLA wet gel is prepared by dissolving PLLA powder in dioxane.

The wet gel may be soaked in dimethyl sulfoxide (DMSO) before being soaked in acetic acid. In particular, DMSO is a first solvent and the acetic acid is a second solvent for replacing the liquid phase of the wet gel, i.e. removing water from a hydrogel. Putting PEDOT:PSS hydrogel in DMSO does not exhibit the shrinkage problem, but the sample takes a very long time to dry. The way to shorten the time is to replace the DMSO in the gel with acetic acid and then freeze dry the sample. A further approach is to pretreat the PEDOT:PSS wet gel anhydrous alcohol before soaking in the solvent, which minimize the osmotic pressure between the gel and the surrounding solution.

In the step b), the soaked gel is frozen by using liquid nitrogen or is frozen in a freezer.

The present invention further provides an aerogel prepared according to the method described herein. In one embodiment, the aerogel comprises poly(3,4-ethylenedioxythiophene) polystyrene sulfonate and has an average pore diameter of less than 15 nm. In a particular embodiment, the aerogel may has an average pore diameter of from about 7-11 nm. Preferably, the aerogel has an electrical conductivity of at least 0.5 S/cm or in the range from about 0.5-2.0 S/cm.

In another embodiment, the aerogel comprises polyvinylidene fluoride and has a water contact angle of about or more than 150°, about or more than 160°, or about or more than 170°.

In a further embodiment, the aerogel comprises poly-L-lactide acid and can withstand a force of at least 1000N before cracking.

EXAMPLES

Materials 3,4-ethylenedioxythiophene (EDOT), poly-sodium 4-styrenesulfonate (NaPSS), $Fe(NO_3)_3 \cdot 9H_2O$ and PVA (polyvinyl alcohol) were purchased from Sigma-Aldrich Company Ltd. Acetic acid and dimethyl sulfoxide (DMSO) were purchased from Oriental chemicals & lab. Supplies Ltd. with their purity in Guaranteed Reagent grade. All chemicals were used without further purification.

Synthesis

I. PEDOT:PSS Aerogel

The hydrogel synthesis was based on Zhang's study (Zhang, X. et al., Carbon (49) (2011), 1884-1893). 0.157 g NaPSS (0.76 mmol) and 50 μL (0.47 mmol) EDOT monomer were put into 7.5 mL deionized water, and the mixture were ultrasonicated until a uniform dispersion like skimmed milk was formed. Then 1.0 mL 1.0 wt. % PVA solution was added into said dispersion with further sonication for a short while—PVA does not play a significant role in this study, but the wet gel formula is kept the same for comparison with Zhang's work. Finally the oxidant solution (7.68 g (19.0 mmol) $Fe(NO_3)_3 \cdot 9H_2O$ dissolved into 5 mL deionized water) was added into the above mixture and stirred with a magnetic stirrer for a short period (1000 RPM, 60s) and then put into molds for about 24 h to form PEDOT:PSS hydrogel.

The PEDOT:PSS hydrogels were subsequently separated from the molds and soaked in a large amount of 0.1 mol HCl solution and then deionized water in sequence for 6 days to wash out low molecular weight elements. The hydrogel produced was then cut to the required shape in deionised water. The water was replaced by acetic acid by soaking the hydrogel sample in 2.5% acetic acid solution first, then transferred to 5% solution, with 2.5% increased concentration each step and finally up to 100%, and repeat soak the sample in the 100% acetic acid, i.e. anhydrous acetic acid, twice in order to minimise the residual water amount. The hydrogel sample was soaked in acetic acid for at least 45 minutes, or about 1 h each time.

Another hydrogel sample was soaked in DMSO for 24 hours twice to wash out most of water, PSS group and residual $Fe(NO_3)_3$, then soaked in acetic acid at least three times to replace most of the DMSO. The hydrogel sample was soaked in acetic acid for about 5 h each time.

The resulting samples were covered with the solvent solution as protection, then frozen by −20° C. freezer in a stainless steel cup or soaked in liquid nitrogen. Finally the sample was dried in a high vacuum chamber (<3 Pa) for 20 hours.

The PEDOT:PSS is a conductive polymer, specifically PEDOT is conductive while PSS is not. PSS acts to provide a structure for PEDOT. DMSO or ethylene glycol may be applied to prewash the wet gel so as to remove unreacted components such as unreacted PSS or excess PSS. Preferably, DMSO or ethylene applied further forms longer chains with PEDOT in the gel. Acetic acid may remove a portion of PSS to enhance the electrical conductivity of the gel. However, it is noted that an excessive removal of PSS would cause damage to the PEDOT:PSS framework structure. Accordingly, the soaking conditions of the wet gel should be appropriately selected and adjusted to achieve the best result. Preferably, the concentration of DMSO or ethylene glycol used can start from a low concentration such as 5% v/v or lower to a high concentration such as 100% at the end. Also, the soaking time can be adjusted from 24 hours thrice to 2 hours once.

In a further preferred example, a PEDOT:PSS hydrogel, after moulding, is soaked in a large amount of hydrochloride acid, preferably 0.1M hydrochloride acid, followed by soaking in deionized water for more than 1 day, preferably for about 4 to 8 days in particular for 6 days. After that, the resulting hydrogel is soaked in anhydrous alcohol in particular anhydrous ethanol twice in order to replace all water out from hydrogel. Accordingly, the hydrogel becomes an alcohol gel. Next, the alcohol gel is soaked in anhydrous acetic acid preferably for at least 2 times or at least 3 times to fully replace the alcohol in particular ethanol with acetic acid. These soaking steps are advantageous in that the osmotic pressure between the gel and the surrounding solution is greatly reduced, thereby reducing cracking of the gel caused by any shrinkage or swelling. Further, the resulting acid gel is subject to freezing, e.g. by freezing the acid gel in −80° C. freezer or using liquid nitrogen. The frozen gel is then dried in a vacuum chamber for removing the liquid phase in the gel, thereby forming the aerogel. In the example, there is no need to use DMSO or ethylene glycol to prewash the wet gel. The inventors found the PEDOT:PSS aerogel formed in accordance to this example does not have any shrinkage.

Further to the above example, an additional step may be included before soaking the alcohol gel in the anhydrous acetic acid. Before soaking in the anhydrous acetic acid, the alcohol gel is soaked in about 80% (v/v) acetic acid and kept in room temperature (about 20° C. to 25° C.), or at about or above 80° C. for at least 30 min. The soaked gel may be kept at 80° C., 120° C., 140° C., 160° C., 180° C. or 200° C. for about 30 min. This additional step is advantageous in that it enhances the electrical conductivity of the resulting aerogel. The inventors performed a test to determine the electrical conductivity of the resulting aerogel prepared by keeping the gel at 20° C., 80° C., 120° C. or 160° C. for 30 min before soaking into the anhydrous acetic acid. The results are presented in Table 1 below.

TABLE 1

Electrical conductivities of PEDOT:PSS aerogel samples prepared with an initial ratio of 1:1 under different conditions

| PEDOT:PSS aerogel sample | PEDOT:PSS final ratio | Temperature | Electrical conductivity (S/cm) |
|---|---|---|---|
| 1 | 3.03:1 | 20 | 2.91 |
| 2 | 3.56:1 | 80 | 3.04 |
| 3 | 3.03:1 | 120 | 3.33 |
| 4 | 2.64:1 | 160 | 3.53 |

The table shows the electrical conductivity of PEDOT:PSS aerogel prepared with an initial ratio of 1:1. It is believed that the aerogel prepared by keeping the gel at 180° C. or 200° C. also have the enhanced electrical conductivity. The additional step facilitates the removal of unstable side branches of the gel framework so as to enhance the electrical conductivity. The PEDOT:PSS aerogels may be prepared at a ratio of from 3:1 to 1:3, preferably 2:1 to 1:2, 1:1 to 2:1, or 1:1. In an embodiment where the aerogels are prepared at the initial ratio of 1:1, the final ratio of PEDOT to PSS in the resultant aerogel ranges from 1:1 to 15:1. The aerogel prepared with the initial ratio of 1:1 has the best structure and at the same time good electrical conductivity in particular of at least 2 S/cm, about 2 to 5 S/cm, or about 2.5 to 4 S/cm. Table 2 below shows the final ratio of PEDOT:PSS in PEDOT:PSS aerogel prepared with various initial ratios.

TABLE 2

Final ratio of PEDOT:PSS in PEDOT:PSS aerogel prepared with various initial ratios with the additional treatment step

| Initial ratio of PEDOT:PSS | Final ratio of PEDOT:PSS |
|---|---|
| 1:2 | 0.9:1 to 2.1:1 |
| 2:1 | 2.5:1 to 20:1 |
| 1:3 | 0.9:1 to 1.5:1 |
| 3:1 | 6:1 to 150:1 |

In the absence of the additional treatment step, the final PEDOT:PSS molar ratio (count in monomer) prepared at an initial ratio of 1:1 may range from 1:1 to 10:1. I.e. the relative amount of PEDOT in the resultant aerogel is less than that prepared with the additional treatment step.

In the drying step, the bigger the pressure difference between the saturated vapour pressure of the solvent and pressure applied in dying the solvent, the faster the sublimation of the solvent, i.e. faster rate of drying. Table 3 below lists the saturated vapour pressure of some possible solvents at 25° C. and at their respective freezing point.

TABLE 3

| | Saturated vapour pressure at 25° C. (Pa) | Freezing point ° C. | Saturated vapour pressure at freezing point (Pa) |
|---|---|---|---|
| Water | 3169 | 0 | 611 |
| Tert-Butanol | 5600 | 20 | 4018 |
| Acetic acid | 2042 | 16.5 | 1218 |
| DMSO | 0.5 | 18.55 | 0.4 |
| Benzene | 12689 | 5.5 | 4774 |
| Formic acid | 5485 | 8.6 | 2256 |
| Acetone | 30670 | −94.9 | 1.433 |
| Methanol | 16851 | −97 | 0.085 |
| Acetonitrile | 12310 | −48 | 105.39 |

A two-stage oil vacuum pump may be applied to create a pressure of about 0.6-100 Pa. For instance, at 0° C., water has a saturated vapour pressure of 611 Pa which significantly larger than 100 Pa, a hydrogel can thus be freeze dried. Acetic acid has a lower saturated vapour pressure at 25° C. than water does. However, acetic acid has a higher freezing point and the saturated vapour pressure at the freezing point is 1218 Pa, which means a gel containing acetic acid can be dried in a faster rate compared with a gel containing water, in particular the rate increases by at least 2-fold.

II. PLLA Aerogel

A wet gel may be made from polylactic acid (PLLA). The steps for preparing a PLLA hydrogel include: mixing 0.715 g PLLA with 5 ml dioxane and 1.25 ml ethanol in a sealed glass sample vials, then heating the mixture to 90° C. until the components fully dissolved, mixing the mixture thoroughly and then putting it in −20° C. freezer for gelling. After that, the frozen sample is taken out from the freezer and soaked in ethanol at 0° C. Ethanol slowly dissolves the solid dioxane remains on the PLLA framework and forms an alcohol gel. The resulting alcohol gel is heated to room temperature, and washed with acetic acid to replace the alcohol in the gel. After soaking with acetic acid for 5 times, the soaked gel is frozen by either freezer or liquid nitrogen.

The compressive strength of the obtained PLLA aerogels (with a size of about 24 mm in diameter, 40 mm in height) were tested using a Zwick static materials testing machine (5 kN) at a crosshead speed of 1 mm min$^{-1}$. All samples are capable of withstanding a load force of more than 1000N. In particular, the samples can withstand a load of more than 3000N. Table 4 below shows the results obtained from the test.

TABLE 4

| PLLA aerogel sample (s) | Maximum Load (N) |
|---|---|
| Sample 1 with a compressed length of 4 mm | 2036.03 |
| Sample 2 with a compressed length of 24.6 mm | 1654.48 |
| Sample 3 with a compressed length of 24.3 mm | 3112.13 |

TABLE 4-continued

| PLLA aerogel sample (s) | Maximum Load (N) |
|---|---|
| Sample 4 with a compressed length of 13 mm | 3144.52 |
| Sample 5 with a compressed length of 13 mm | 3260.45 |
| Sample 6 with a compressed length of 13 mm | 3397.45 |

The inventors further found that the samples can withstand a human bite force of about 800N and therefore the PLLA aerogel prepared according to the method as described herein can be used in various medical applications such as manufacturing of dental products.

III. PVDF Aerogel

The method of the present invention is also suitable for preparing semi-conductive or non-conductive aerogel such as PVDF gel or PLLA gel as described herein.

In an example, a PVDF wet gel is prepared by dissolving PVDF powder in dimethylacetamide (DMAC), heating to around 80° C., slowly adding ethanol, then cooling at −80° C. for gelling. After cooling ethanol or DI water may be used to remove DMAC from the wet gel to form a PVDF alcohol gel or hydrogel.

The PVDF aerogel prepared according to the method has a water contact angle of more than 150°, more than 160°, or more than 170°. The PVDF aerogel is very hydrophobic in nature and can be applied in the preparation of a liquid-solid triboelectric generator, an anti-fouling material or the like.

Instrumentation

Thermal conductivity was measured by TCi thermal conductivity analyser from C-Therm technologies.

The electric conductivity was calculated as the inverse of resistivity $\sigma=1/\rho$, and resistivity was calculated as $\rho=RA/L$. Before the resistance measurement, a digital picture was taken horizontally above the sample on a 40*40 mm ceramic base.

The cross sectional area can be calculated by $$\frac{A}{N} = \frac{Ab}{Nb},$$

where A, Ab, N, and Nb are respectively top surface area of the sample, area of the ceramic base, number of pixels in sample image and number of pixels in base image respectively. Ab in this case was 1600 mm$^2$.

The resistance and length was measured by a modified digital Vernier caliper with Keithley 2700 multimeter.

A system for measuring the resistance of the sample is used, whereby two ceramic plates are provided to insulate the sample from the Vernier caliper, with two copper film linking to the Keithley multimeter to give the reading. A thin layer of silver paste is applied between the sample and the two copper film electrodes, and the reading Rt is obtained. The sample is then removed and the system resistance Rs is read, whereby the sample resistance R can be calculated as R=Rt−Rs.

Seeback coefficient was calculated based on S=dV/dT, and a test platform was built to generate and measure a temperature gradient dT and the resulting output dV.

Brunauer-Emmett-Teller (BET) tests were measured by ASAP 2020 from Micromeritics. The degas condition was heated to 90° C. at 10° C./min, maintained for 1 hour, then heated to 160° C. and maintained for 4 hours.

The apparent density was obtained by measuring the volume and weight of a cylinder aerogel.

SEM was test by EVO MA10 scanning electron microscope from Carl Zeiss.

UV-VIS test of the wash out solutes after acetic acid soaking was examined by SHIMADZU UV-2600 UV-VIS spectrophotometer. The acetic acid solution after a few samples' soaking was dried at room temperature to remove the acetic acid, resuspended in deionised water, then compared with low concentration NaPSS solution and $Fe(NO_3)_3$ reference solution TGA was carried out by TGA/DSC 1 STAR system from Mettler Toledo from room temperature to 900° C. at 10° C./min heating rate with $N_2$ gas protection, with extra one hour $N_2$ gas flow for preliminary water removal. The initial weight of samples was 5-7 mg in all the cases.

Results

Unlike other single polymer hydrogels, when PEDOT:PSS hydrogel is placed in high concentration acetic acid the water in the side gel is sucked out much faster than acetic acid can move in, and this difference generates pressure causing the gel to shrink. By slowly increasing the concentration of acetic acid this problem is minimised.

The dry and resuspended solution has two absorption peaks, the higher one at around 200 nm, and the lower one at 227 nm, which is the accumulation of PSS and ferric ion's absorptions. There was no absorption above 500 nm. The UV-VIS results verify the dedoping effect of acetic acid solution, whereby PSS and ferric ions are removed from the PEDOT:PSS hydrogel (which the remaining ferric nitrate which can't be remove by just deionised water wash). The DMSO solution after one sample soaking shows dark brown colour, as a result of the ferric nitrate with PSS being removed from the PEDOT:PSS framework.

Thermal stability of the resulting PEDOT:PSS aerogel was investigated by TGA. A first hydrogel sample was dried by a conventional freeze drying process (as a control). Further samples AAS9 and AAS10 were treated by replacing the water with acetic acid, and were then frozen with liquid nitrogen or −20° C. freezer respectively. Sample DMSOAAS3 sample was treated by replacing water with DMSO solution first, then soaking in acetic acid 4 times to get acetic acid gel.

During the preliminary drying process Hydrogel, AAS9, AAS10, and DMSOAAS3 samples lost 11.13%, 10.83%, 10.88% and 7.07% weight respectively. The freezing methods did not affect the composition of the samples, thus AAS9 and AAS10 have identical curves (and thus only AAS9 is shown, as representative). The water absorbed by PEDOT:PSS aerogel is mainly due to the PSS group, the weight loss after preliminary drying process demonstrating that acetic soaking process removed few PSS groups from the gel backbone, and DMSO heavily removed massive PSS groups from the gel backbone.

The hydrogel sample showed a similar result as SC—CO$_2$ dried sample, with further water removal until 130° C., showing a weight loss of about 5%. A second loss of mass of about 2% appears between 180° C. and 260° C., due to PSS degradation, the sulfonate group being released from styrene. A final mass loss of more than 34% occurs between 270° C. and 500° C., which is likely associated with rupture of the polymer backbones.

The AAS9 and AAS10 samples have similar curves compared with the hydrogel sample, although generally the amount of mass lost was less than hydrogel sample. The further water loss, PSS degradation and backbone break up was associated with 4%, 1% and 38% mass loss respectively. This difference is due to PSS removal during acetic acid soaking.

The DMSOAAS3 sample shows even less water loss, only 3% of mass. A second loss of mass of more than 10% appears between 170° C. and 270° C. indicates that the DMSO treatment makes PSS highly unstable under high temperature. A third mass loss of about 6% occurs between 270° C. and 350° C., which is likely due to the breakup of PEDOT. The final mass loss of about 25% occurs between 350° C. and 500° C. due to the degradation of the remaining polymer.

As such it appears that acetic acid can remove some PSS from the aerogel without sacrificing the thermal stability, while DMSO can heavily remove PSS, but the sample becomes unstable at high temperature.

The porous properties of the resulting PEDOT:PSS aerogels were examined by the nitrogen adsorption/desorption test. FIG. 1 shows the typical nitrogen adsorption and desorption isotherms of samples with different preparation methods. Sample AAS9 and DMSOAAS3 show Type II isotherm characteristics. The intermediate flat region in the isotherm corresponds to monolayer formation. While the hydrogel sample shows Type IV isotherm, the lower pressure region of graph is similar to the DMSOAAS3 sample, due to formation of monolayer followed by multilayer. The saturation level is reached at a pressure below the saturation vapor pressure because gases are condensed in the tiny capillary pores created by water expansion of adsorbent at pressure below the saturation pressure of the gas.

Figure 2:
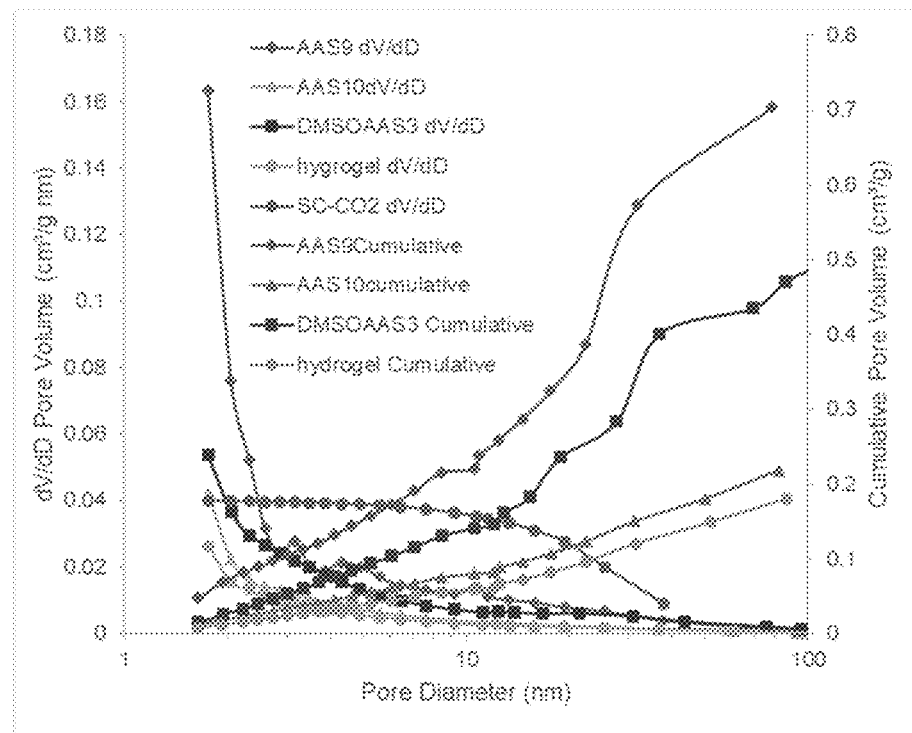
FIG. 2 is a chart illustrating BJH (Barret-Joyner-Halenda) desorption pore size distribution of the resulting PEDOT:PSS aerogels
Figure 3A:
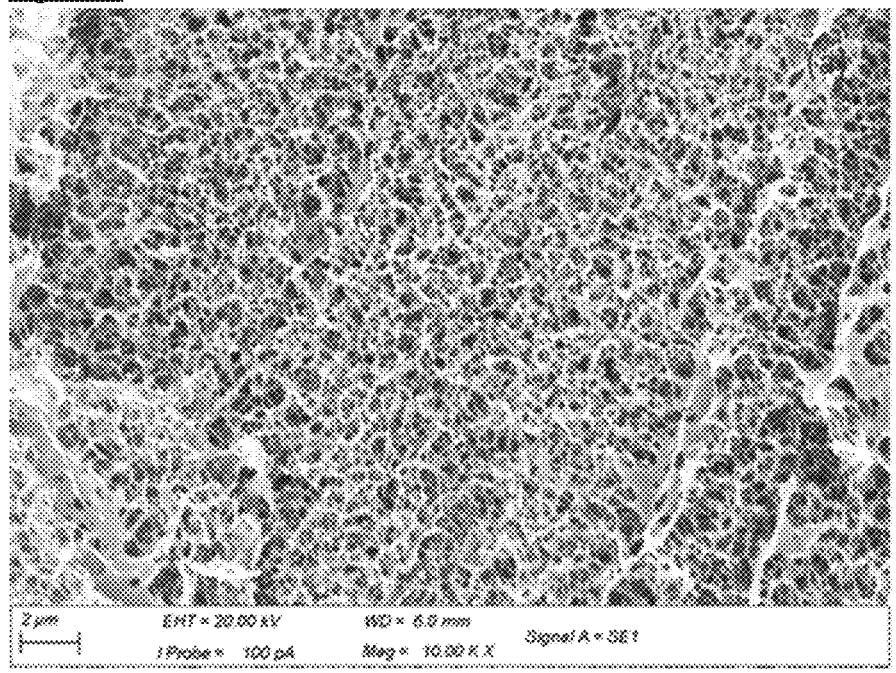
FIGS. 3a-3h illustrate SEM images of the resulting PEDOT:PSS aerogel samples.
Figure 3B:
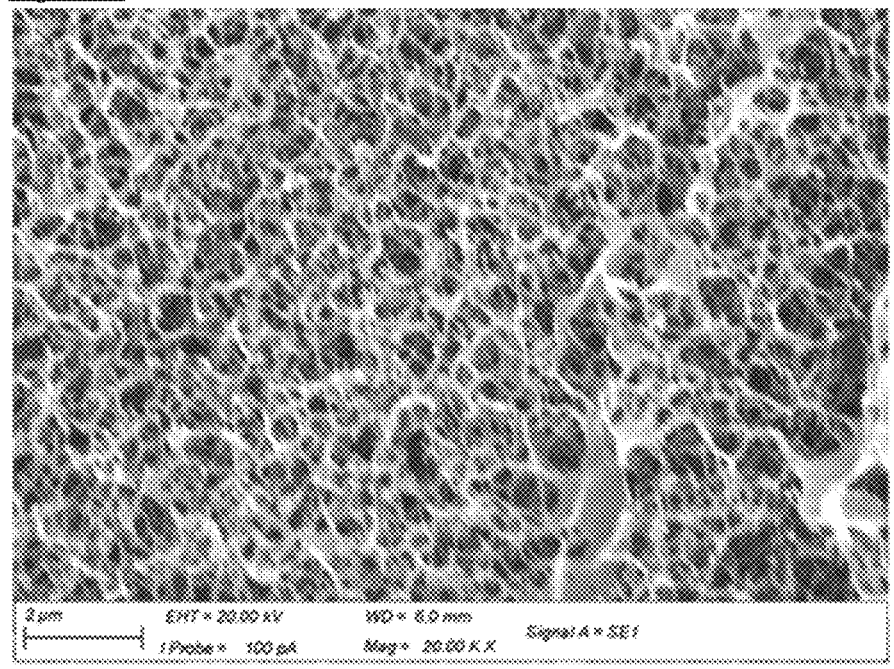
Figure 3C:
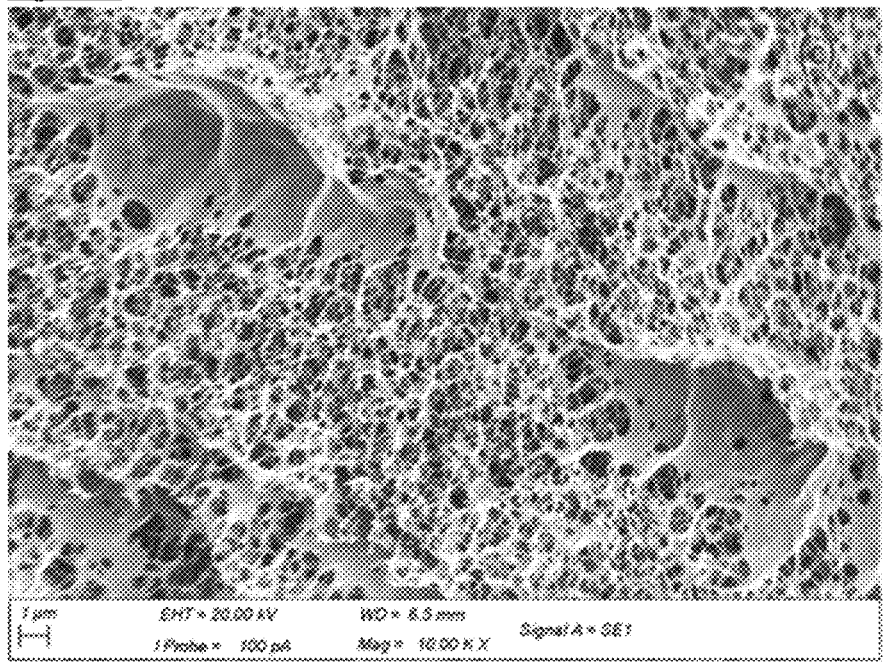
Figure 3D:
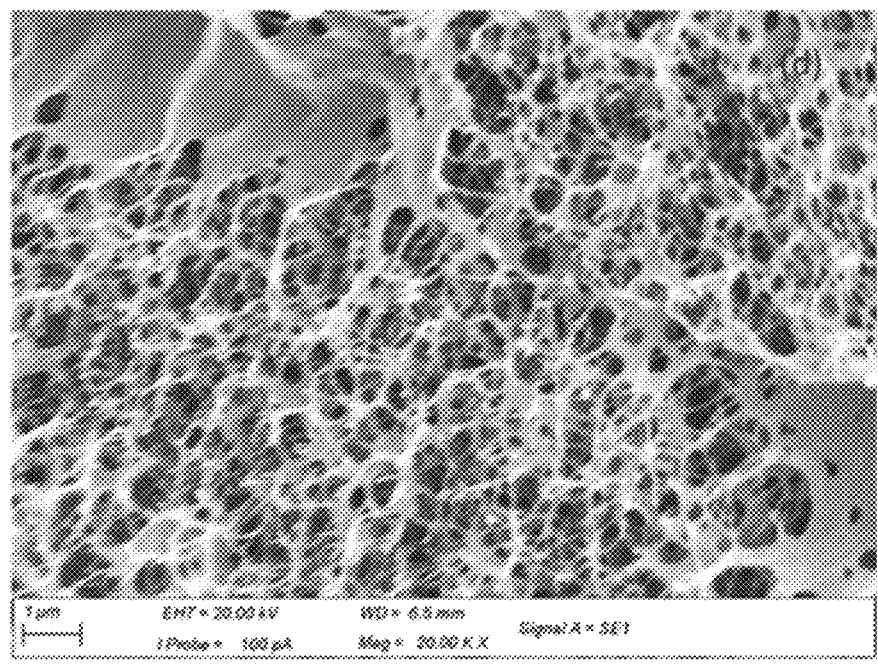
Figure 3E:
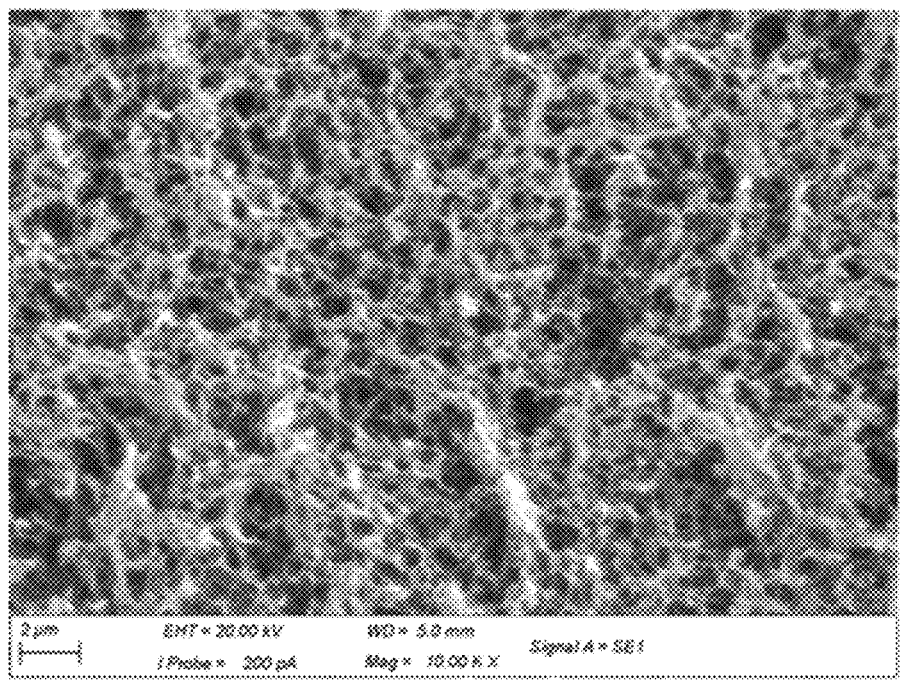
Figure 3F:
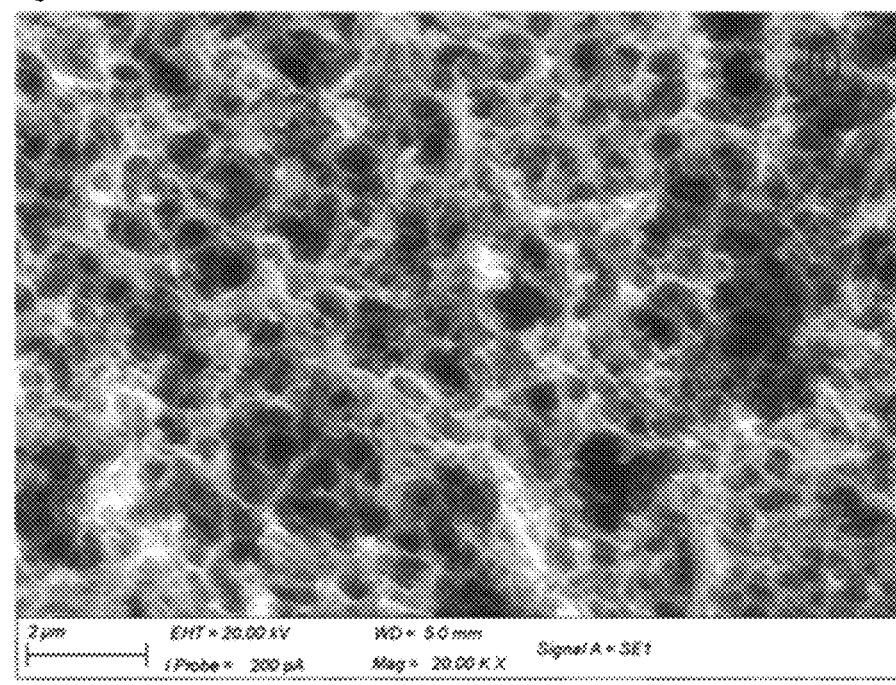
Figure 3G:
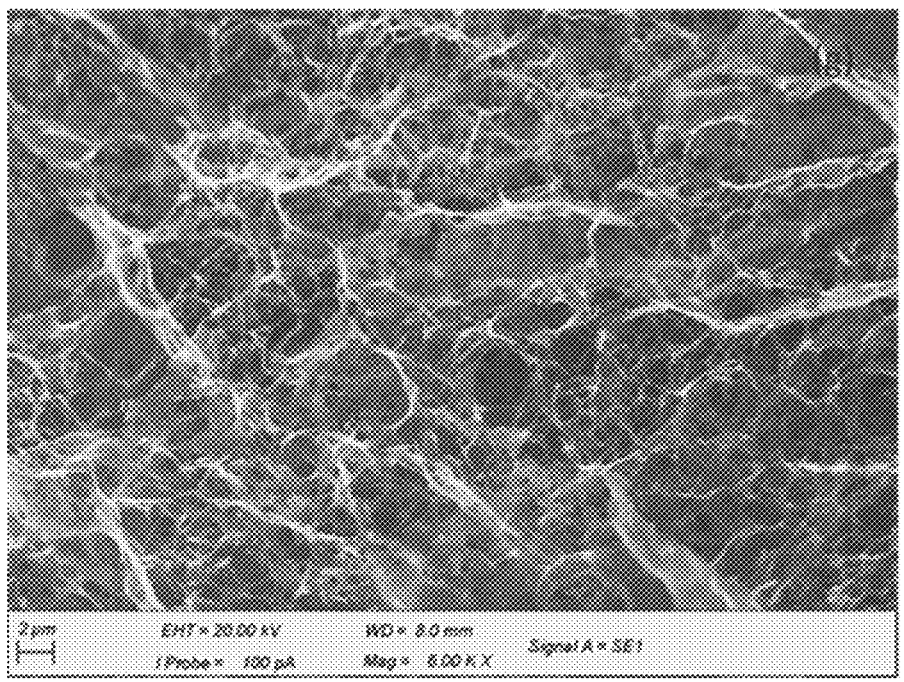
Figure 3H:
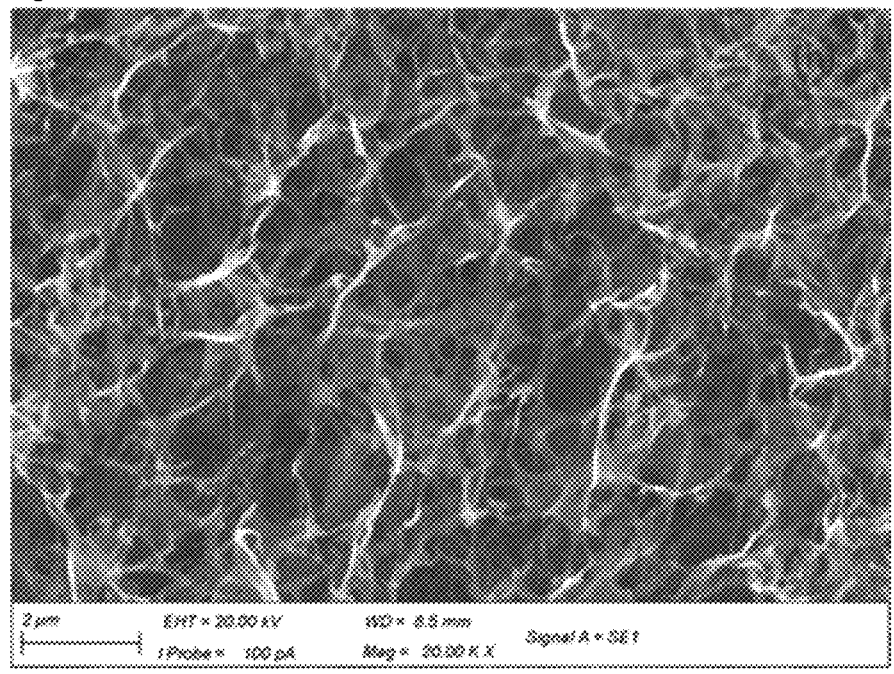

As shown in FIG. 2, AAS9 has a larger number of micropores with pore sizes less than 2 nm compared with the others, which may be due to the liquid nitrogen freeze where the tiny framework is maintained. In contrast, crystals form in sample AAS10 during the freezing step, and hydrogel sample loses most of the micropores due to the water expansion. DMSOAAS3 sample maintains a significant amount of micropores although the PSS washout causes some of the structure to be lost.

The sample SC—$CO_2$ was dried by supercritical $CO_2$ drying method, as per Zhang's work. In contrast to the samples of described above, the pores have a wide diameter range. This may due to the limitation of supercritical $CO_2$ drying method, as the sample cannot fully dry after the pressure is released, and the $CO_2$ transforms some of the micropores into mesopores. Sample AAS9 has about 4 times the number of micropores than the material formed in the supercritical $CO_2$ drying method.

Table 5 summarizes the porous properties of the resulting PEDOT:PSS aerogels according to the nitrogen adsorption/desorption test.

TABLE 5

| Name | Apparent Density (g/cm3) | BET surface area (m2/g) | External surface area (m2/g) | Total pore volume (cm3/g) | Average pore diameter (nm) | shrinkage |
|---|---|---|---|---|---|---|
| AAS9 | 0.027 | 395.3 | 352.46 | 0.724 | 7.3 | 0.156 |
| AAS10 | 0.027 | 104.86 | 97.13 | 0.215 | 8.2 | 0.159 |
| DMSOAAS3 | 0.026 | 171.5 | 168.65 | 0.474 | 11 | 0.057 |
| hydrogel | 0.041 | 76.19 | 72.14 | 0.175 | 9.2 | 0.05 |
| Aerogel-01 | 0.044 | 315.91 | 313.28 | 1.211 | 15.3 | 0.05 |

All the samples dried by the solvent replacement freeze drying method have a significantly higher BET surface area and total pore volume than the conventional freeze drying method. Sample AAS9 has even higher BET surface area than sample Aerogel-01 (which is made by SC—$CO_2$ drying method) due to preservation of micropores. The acetic acid soaking samples shrink by an extra 10% or so compared with model diameters, which may be due to PSS being alienated with acetic acid.

FIGS. 3a-3h shows micrographs of the samples to allow comparison of the physical structures. It can be seen that AAS9 has a well distributed pore structure, and AAS10 has a similar pore structure, but also some large cavities. Sample DMSOAAS3 still has small pores, but some of the structure is missing. In the hydrogel sample, the framework structure is still visible but filled with large cavities.

The thermoelectric properties of the PEDOT:PSS aerogel samples are illustrated in Table 6 below:

TABLE 6

| Name | Electrical conductivity (S/cm) | Thermal conductivity (W/m · K) | Seeback coefficient (µV/K) | Environmental temperature (K) | ZT |
|---|---|---|---|---|---|
| AAS9 | 1.0458 | 0.031 | 10 | 300 | 0.000101 |
| AAS10 | 1.2951 | 0.03 | 12 | 300 | 0.000186 |
| DMSOAAS3 | 0.8363 | 0.037 | 4.5 | 300 | 1.37E−05 |
| hydrogel | 0.0017 | 0.031 | 80 | 300 | 1.04E−05 |

AAS9 is the acetic acid gel frozen by liquid nitrogen at −196° C., then dried in a vacuum, AAS10 is the same sample frozen in a −20° C. freezer, DMSOAAS3 is the acetic acid gel replaced from DMSO gel, then frozen by liquid nitrogen at −196° C. Hydrogel sample is the hydrogel direct freeze by liquid nitrogen to −196° C.—although it cracks into two pieces it still can be dried in a vacuum for all the tests.

All the aerogel samples have ultra-low thermal conductivity. The solvent replacement freeze dried samples all have approximately 3 orders of magnitude higher electrical conductivity than hydrogel sample and 2 orders of magnitude higher than the sample Aerogel-01 (0.012 S/cm) from Table 6, which has the same composition, but dried by supercritical $CO_2$ drying method. This is due to the dedoping effect of the acetic acid solution and the detailed framework structure of the aerogel backbone. The DMSOAAS3 sample has slightly lower electrical conductivity than acetic acid soaking samples, perhaps due to the DMSO soaking process which removes PSS significantly and damages the PEDOT:PSS backbone.

The ZT of the PEDOT:PSS aerogels are not significantly high in this study. But by reducing DMSO soaking time, doping with high Seebeck coefficient particles or treatment which increase free charge carriers, the Seebeck coefficient may be increased to improve ZT.

It should be noted that the solvent in the gel during gelling is not necessarily the same as the solvent used in the freeze drying step. This method may be suitable for most kinds of gel dry to aerogel without change the gelling methods, and careful solvent selection may retain the detailed framework structure as well as the supercritical $CO_2$ drying method.

In conclusion the quality of PEDOT:PSS aerogel made by the solvent replacement freeze drying method is similar or better than made by supercritical $CO_2$ drying method. The resulting PEDOT:PSS aerogels show ultralight weight (0.027 g/cm³), large BET surface area (395.3 m²/g), high electric conductivity (1.3 S/cm) and ultralow thermal conductivity (0.03 W/m·K), which is promising for thermoelectric applications.

The solvent replacement freeze drying method described herein may also be suitable for other polymer aerogel synthesis. By careful solvents selection, this method may also work for some inorganic material. This method is very promising to reduce the threshold of production and use of aerogels.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated by persons skilled in the art that the present invention may also include further additional modifications made to the method which does not affect the overall functioning of the method.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A method for making an aerogel comprising the steps of:
   a) soaking a wet gel having a liquid phase in at least one solvent to replace the liquid phase in the wet gel with said solvent to form a soaked gel, wherein the solvent is acetic acid;
   b) freezing the soaked gel to form a frozen gel; and
   c) drying the frozen gel in a vacuum chamber to form an aerogel.

2. The method according to claim 1, wherein the aerogel comprises poly(3,4-ethylenedioxythiophene) polystyrene sulfonate.

3. The method according to claim 2, wherein the wet gel is prepared by mixing sodium polystyrene sulfonate and 3,4-ethylenedioxythiophene monomer at a molar ratio of from about 1:1 to about 2:1.

4. The method according to claim 1, wherein in the step a), the wet gel is pretreated by soaking in an acid and then water sequentially for more than 1 day, before soaking in the solvent.

5. The method according to claim 4, wherein the acid is hydrochloride acid, and the water is deionized water.

6. The method according to claim 5, wherein the wet gel is further soaked in anhydrous alcohol for at least 1 time before soaking in acetic acid.

7. The method according to claim 1, wherein the aerogel comprises polyvinylidene fluoride and has a water contact angle of more than 150°.

8. The method according to claim 1, wherein the aerogel comprises poly-L-lactide acid and can withstand a force of at least 1000N before cracking.

9. The method according to claim 1, wherein the wet gel is soaked in increasing concentrations of acetic acid.

10. The method according to claim 9, wherein the wet gel is soaked in 2.5% (v/v) acetic acid, and subsequent concentrations of acetic acid increasing by 2.5% (v/v) stepwise up to 100% (v/v).

11. The method according to claim 1, wherein the solvent is anhydrous.

12. The method according to claim 1, wherein in the step b), the soaked gel is frozen by using liquid nitrogen or is frozen in a freezer.

13. The method according to claim 1, wherein in the step c), the vacuum chamber has a pressure of <3 Pa and the frozen gel is dried in the vacuum chamber for at least 20 hours.

14. The method according to claim 1, wherein the solvent has at least one of the features selected from having a saturated vapour pressure of more than 1000 Pa at its freezing point; or is miscible or partially miscible with the liquid phase of the wet gel.

* * * * *